United States Patent Office 3,398,014
Patented Aug. 20, 1968

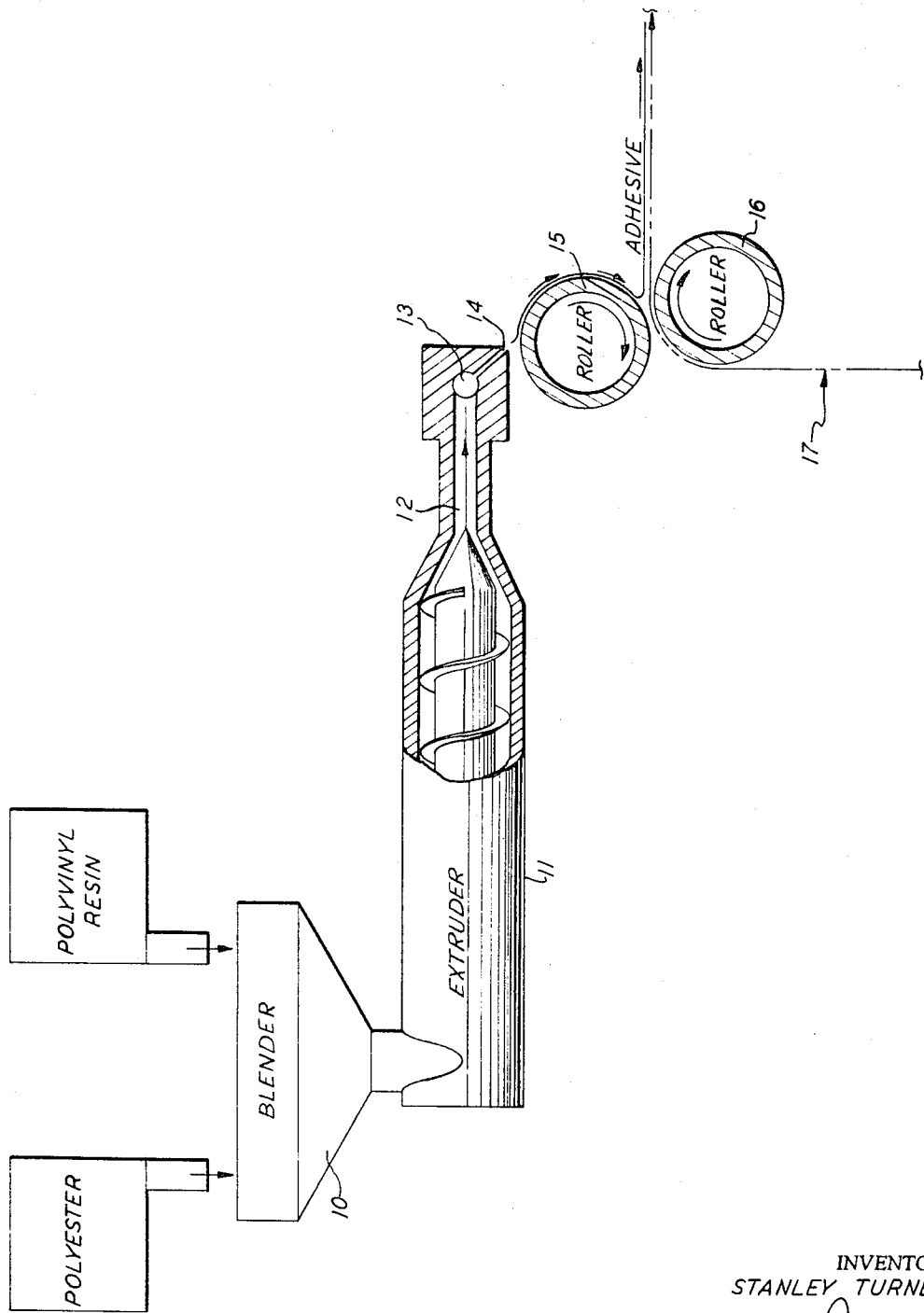

3,398,014
PROCESS FOR MANUFACTURE OF STABILIZED
PRESSURE SENSITIVE ADHESIVE
Stanley Turner, Costa Mesa, Calif., assignor, by mesne assignments, to Avery Products Corporation, San Marino, Calif., a corporation of California
Application Aug. 17, 1961, Ser. No. 136,126, now Patent No. 3,300,543, dated Jan. 24, 1967, which is a continuation-in-part of application Ser. No. 685,665, Sept. 23, 1957. Divided and this application Jan. 18, 1967, Ser. No. 632,840
5 Claims. (Cl. 117—111)

ABSTRACT OF THE DISCLOSURE

A process for the manufacture of a stabilized pressure sensitive adhesive where a mixture of polyesters and polyvinyl resin containing by weight from 60% to 90% polyesters and from 10% to 40% polyvinyl resin is heated to a temperature from about 140° C. to about 220° C. in an extruder which provides a high shear type of agitation as the mixture passes through the extruder and is continuously extruded at high velocity through an opening for coating on a web surface.

---

This application is a division of application Ser. No. 136,126 filed Aug. 17, 1961 now Patent No. 3,300,543 which is a continuation-in-part application of my copending application, Ser. No. 685,665, filed Sept. 23, 1957, now abandoned. This invention relates to a pressure sensitive adhesive and particularly to an adhesive resistive to the deteriorating effects of ultraviolet light.

One of the most common utilizations of pressure sensitive adhesives is as a coating on one side of a cloth or paper web. The adhesive-coated web may be produced in wide sheets for use as a protective covering for materials such as plastics or glass. It may also be produced in narrow strips conveniently wound in rolls for various household and industrial uses. For these purposes the pressure sensitive adhesive must have characteristics of good tensile strength and cohesion and must possess sufficient adhesiveness or tack to bind the web to another surface upon the application of pressure. Further, it must be removable from the other surface without deposition of a gummy residue.

Among pressure sensitive adhesives presently in common use, two problems are particularly troublesome. The first is that the adhesive is extruded from between layers of an adhesive coated web wound in a roll and forms a hardened coating binding the several layers together. This is known as "cold flow." A second is that the pressure sensitive adhesives now in existence deteriorate in the presence of ultraviolet light. Some adhesives become brittle and hard so as to become unusable and other adhesives become too fluid for use after exposure to such light.

The present invention relates to a pressure sensitive adhesive which, in addition to resisting the deteriorating effects of ultraviolet light, possesses excellent characteristics of cohesion and tensile strength without exhibiting cold flow. The adhesive of the present invention is the reaction product of a polyester of a saturated organic acid and a saturated polyhydric alcohol with a polyvinyl resin, the mixture containing a greater proportion of the polyester. It is generally preferred that the two reactants be combined in the presence of a stabilizing compound that is an acceptor for hydrogen chloride evolved from the polyvinyl resin when the mixture of reactants is subjected to agitation at an elevated temperature. The reaction yields a product possessing properties of tack and tensile strength particularly suitable for use as a pressure sensitive adhesive.

While polyvinyl resins have in the past been combined with small amounts of polyesters, the polyesters in such compounds have been used only as plasticizers to increase the flexibility of the final product. The product of such a reaction is a thermoplastic possessing properties in no way similar to the product of this invention, which product results from combining a polyvinyl resin and a polyester in a mixture in which the polyester is present in the predominant amount. The pressure sensitive adhesive of the present invention is obtained when the mixture is agitated at an elevated temperature within the range from 140° C. to 220° C. A temperature within the range from 160° C. to 200° C. is presently preferred since a suitable pressure sensitive adhesive can be obtained from most of the polyester-polyvinyl resin systems within this temperature range.

In the practice of the present invention, a polyester suitable for reaction with the polyvinyl resin is first produced and thereupon reacted with a suitable polyvinyl resin under the required reaction conditions. Where the pressure sensitive adhesive resulting from this reaction is to be applied as a film to a paper or cloth web, the reaction product is applied as a coating to a paper or cloth web as part of a continuous process.

Both linear saturated polyesters and branched saturated polyesters may be satisfactorily used. The reaction product of a saturated dicarboxylic acid and a saturated dihydric alcohol results in a saturated linear polyester which, dependent upon the ratio of the reactants, may be terminated by either carboxyl or hydroxyl groups, or both. Reaction of a glycol selected from the group consisting of 1,3-butylene glycol; 2,3-butylene glycol; neopentyl glycol; 1,5-hexylene glycol; 1,5-pentanediol; 3-methyl pentanediol-1,5; and 2-ethylhexanediol with a dicarboxylic acid selected from the group consisting of adipic, azelaic, sebacic and isosebacic acids produces a polyester suitable for further reaction with particular polyvinyl resins.

The selected glycol and discarboxylic acid are combined in such proportions as required to yield a polyester of desired molecular weight when an acid number of zero is approached or reached. Since some glycol loss occurs, an excess of the glycol sufficient to compensate for the anticipated evaporative loss is initially added. Determinations of the acid number as the reaction proceeds may be used as a control test.

The following are specific reactions by which preferred polyesters were obtained:

(1) Azelaic acid was combined with 1,3-butylene glycol in proportions sufficient to produce a polyester having an average molecular weight from 8500 to 8800 at a zero acid number. This polyester has a viscosity at 25° C. of 19,250 to 20,100 cps. and is the linear polyester product found best suited for use in the process of the invention.

(2) Isosebacic acid was combined with 1,3-butylene glycol in proportions sufficient to produce a polyester having an average molecular weight from 8000 to 10,000 at a zero acid number. While this polyester is equal in properties to the azelaic acid polyester described in the preceding paragraph, it is more difficult to process to a low acid number.

(3) Isosebacic acid was combined with neopentyl glycol in proportions sufficient to produce a polyester having a molecular weight of about 6000 at a zero acid number.

In addition to the linear polyesters described above, a polyester having a branched structure suitable for the process of this invention may be obtained from the esterification of a monocarboxylic acid by treatment with a polyhydroxyl alcohol in the presence of a catalyst such as lead oxide or lithium hydroxide. The reaction is allowed to proceed until esterification is substantially complete. Thereupon, a glycol and a dicarboxylic acid are added to the mixture and the reaction is continued until complete esterification is attained. Examples of polyhydroxyl alcohols satisfactorily used in this reaction are trimethylol propane; trimethylol ethane; glycerol; pentaerythritol; and 1,2,6-hexanetriol. Examples of monocarboxylic acids used in this reaction are 2-ethylhexoic acid, 2-ethylbutyric acid, and caprylic acid. Examples of glycols satisfactory for this reaction are propylene glycol; 1,3-butylene glycol; 2,3-butylene glycol; neopentyl glycol; 1,5-hexylene glycol; 1,5-pentanediol; 3-methyl pentanediol-1,5; and 2-ethylhexanediol-1,3. Examples of dicarboxylic organic acids satisfactory for this purpose are adipic, azelaic, sebacic and isosebacic acids.

It is apparent that the four required reactants may be combined in a large number of combinations. The following represent the proportion and the nature of reactants typical of those reactions by which polyesters, preferred for the process of the invention, were produced.

(1) The reaction of 8 mols trimethylol propane, 8 mols 2-ethylhexoic acid, 9 mols 1,3-butylene glycol, 16 mols azelaic acid produced a tacky, rubbery solid at 25° C. and a viscous fluid at 100°C.

(2) The reaction of 5 mols trimethylol propane, 5 mols 2-ethylhexoic acid, 6 mols neopentyl glycol, 10 mols adipic acid produced a firm tacky gel at 20° C. and viscous fluid at 50° C.

(3) The reaction of 10 mols 1,2,6-hexanetriol, 10 mols 2-ethylhexoic acid, 11 mols 1,3-butylene glycol and 20 mols azelaic acid produced a rubbery, tacky gel at 20° C. and viscous liquid at 120° C.

(4) The reaction of 10 mols trimethylol propane, 10 mols 2-ethyhexoic acid, 11 mols 1,3-butylene glycol, and 20 mols azelaic acid produced a rubbery, tacky gel at 20° C. and a viscous liquid at 120° C.

(5) The reaction of 5 mols pentaerythritol, 10 mols 2-ethylhexoic acid, 11 mols, 1,3-butylene glycol, and 15 mols azelaic acid produced a rubber gel at 20° C. and a viscous fluid at 140° C.

The polyester produced by these reactions must be a tacky, rubbery gel at 20° C. and a viscous fluid at less than 140° C. It is further required that the polyester be nonthermosetting. In general, any of the reactants previously enumerated may be substituted for a reactant of the same class provided the proportions of reactants are adjusted to provide the properties specified above. In particular, however, the mixture of trimethylol propane; 2-ethylhexoic acid; 1,3-butylene glycol; and azelaic acid in the proportions set forth is a preferred mixture.

An important step in the preparation of polyesters satisfactory for this process is to treat the polyesters once esterification is substantially complete so that any unreacted materials as well as any esters having a molecular weight less than 1000 are removed from the mixture by distillation. For these mixtures, molecular distillation is particularly suitable. While these low molecular weight materials are thoroughly compatible with the polyester product, their presence is undesirable when the polyester is utilized in the reaction with a polyvinyl resin. The presence of low molecular weight materials lowers the tack of the final product and leaves an objectionable residue on the surface to which the adhesive is applied. This is because the low molecular weight materials migrate to the surface of the adhesive if they remain incorporated in the final product.

The polyesters prepared by either of the reactions set forth above are then reacted with a polyvinyl resin. The term polyvinyl resin as used herein refers to polyvinyl chloride and copolymers containing from 50–95% vinyl chloride, the balance being varying amounts and combinations of ester compounds, as, for example, vinyl esters, compounds containing carboxyl groups, and/or vinyl alcohol. While not so limited, the polyvinyl resin with which the polyester is reacted is generally a copolymer containing both vinyl chloride and vinyl acetate. The reaction mixture must contain a preponderance of the polyester. Within this limitation, however, the proportion of a given polyvinyl resin in the reaction mixture may be varied, thereby affecting the tack and tensile strength of the final product.

The proportions of polyester and polyvinyl resin needed to produce a pressure sensitive adhesive of preferred characteristics depend both upon the particular polyester and polyvinyl resin combined. For example, a linear polyester prepared from the reaction of a glycol and a dicarboxylic acid is preferably combined with a polyvinyl resin containing approximately 91% by weight vinyl chloride and 9% by weight vinyl acetate, and having a molecular weight of about 25,000 in the following proportions based on weight: 70% polyester, 25% polyvinyl resin, 5% stabilizing compound. With a polyvinyl resin having a molecular weight of 45,000 and containing by weight about 91% vinyl chloride and 9% vinyl acetate, a preferred mixture is compounded in the following proportion based on weight: 75% polyester, 20% polyvinyl resin, 5% stabilizing compound.

When a branched chain type of polyester prepared by the reaction of a polyhydroxylalcohol, a monocarboxylic acid, a glycol, and a dicarboxylic acid is combined with a polyvinyl resin containing by weight 91% vinyl chloride, 3% vinyl acetate, and 6% vinyl alcohol, and having a molecular weight from 15,000 to 18,000, a preferred mixture is compounded in the following proportions based on weight: 70% polyester, 25% polyvinyl resin, 5% stabilizing compound.

With the use of polyesters having either linear or nonlinear molecular structure, the proportions of polyester in the mixture may be varied from about 60% to about 90% by weight and the proportions of polyvinyl resin may be varied from about 15% to about 40% by weight polyvinyl resin. As the concentration of polyvinyl resin is increased above 40%, the product becomes increasingly unsatisfactory as a pressure sensitive adhesive since its tensile strength becomes excessive and its tack becomes too low. A number of commercial polyvinyl resins are available which may be satisfactorily used in the prepartion of the pressure sensitive adhesive. Consistent with the proportions and limitations set forth above, the copolymers obtained from vinyl chloride and vinyl acetate and sold under the trademarks Vinylite VYNS-3 and Vinylite VYCM, and the copolymers obtained from vinyl chloride, vinyl acetate, and vinyl alcohol and sold under the tradename Vinylite VAGH may be satisfactorily used. Other examples of commercial polyvinyl resins which may be satisfactorily used are those sold under the trademarks Exon 450, Exon 471, Exon 481, and Exon 485. The polyvinyl resin used in the preparation of the adhesive of the present invention must remain compatible with the polyester so that subsequent to the reaction no separation of the polyester and polyvinyl resin by migration occurs.

In general, the saturated polyester and polyvinyl resin are combined in the presence of a stabilizing agent. The term is used to describe those compounds which act to absorb any hydrogen chloride released from the vinyl chloride during the reaction and which further act as an antioxidant by blocking unsaturated bonds formed by the release of the chlorine atom. A number of stabilizing compounds have been found suitable to satisfy these functions. These include alkali or alkaline earth oxides, hydroxides, alcoholates, carbonates, or their fatty acid salts, such as lithium ricinoleate or barium ricinoleate or calcium stearate; alkyl and aryl tin compounds such as tin dilaurate or dibutyl tin dimaleate, and tin organic complexes; barium - cadmium organic complexes; lead stabilizers including dibasic lead phthalate, basic lead silicate sulfate, monohydrous tribasic lead sulfate, lead silicate, lead chlorosilicate complex, dibasic lead phosphite, tribasic lead maleate monohydrate, tetrabasic lead fumarate, lead stearate, and normal lead salicylate; and epoxy compounds such as 3,4-epoxy-6-methyl-cyclohexyl-methyl-3,4-epoxy-6-methylcyclohexane carboxylate, 1-epoxyethyl-3,4-epoxycyclohexane, Bisphenol A (2,2-bis (4-hydroxy phenyl) propane) epichlorohydrin epoxy compounds, and methyl esters of epoxidated soy bean fatty acids. Combinations of two or more of the above-enumerated stabilizing compounds may also be employed.

While the stabilizing compounds set forth above perform satisfactorily the required function, dibasic lead phthalate, a mixture of dibasic lead phosphite and 3,4-epoxy - 6 - methylcyclohexylmethyl-3,4-epoxy-6-methyl-cyclohexanecarboxylate; a mixture of a tin organic complex and an epoxy compound, and tetrabasic lead fumarate have been found to be the stabilizing compounds which impart to the adhesive of the present invention the best resistance to ultraviolet light. The stabilizing compounds are added in amounts up to about 5% by weight of the mixture of polyesters and polyvinyl resin.

In general, a suitable stabilizing compound is added to the mixture of polyester and polyvinyl resin. However, when epoxy compounds are utilized as stabilizing compounds, it has been found advantageous to react the appropriate epoxy stabilizing compound with a terminal carboxyl group of a polyester, and then combine the epoxy polyester with the polyvinyl resin. Incorporation of the epoxy stabilizing compound in this manner prevents migration of the stabilizing compound to the surface of the adhesive product.

Since the reaction of an epoxy stabilizing compound with the polyester results in a product of relatively high viscosity, it becomes necessary to maintain the molecular weight of the polyester within certain limits in order to keep the viscosity of the epoxy polyester product at a workable level. Control of molecular weight of the polyester can be accomplished either by use of excess dibasic acid so that the polyester when completely reacted has a molecular weight of from 1000 to 4000 per carboxyl group, or by use of a monofunctional acid or alcohol chain stopper in amounts such that the reacted polyester has an average molecular weight of from 1000 to 4000 per carboxyl group. When equal molar quantities of a dibasic acid and dihydric alcohol are reacted to produce the polyester, the reaction can be stopped when the acid number indicates that the polyester has an average molecular weight of from 1000 to 4000 per carboxyl group.

In the production of the pressure sensitive adhesive of the present invention, the reaction is carried out at a temperature in the range from about 140° C. to about 220° C. The time required for the reaction to be completed varies with the particular polyester and polyvinyl resin, and varies from 6 minutes to 30 minutes. If the reaction time is allowed to proceed for more than 30 minutes, a thermosetting material is produced. The reaction time required for mixtures of polyvinyl resins and branched chain polyesters is considerably less than the reaction time required for mixtures of polyvinyl resins and linear polyesters.

While both physical and chemical reactions occur during the fusion of the mixture at elevated temperatures, the chemical reaction appears to be an ester exchange between the ester part of the polyvinyl resin and the polyester. The ester exchange is promoted by the catalytic effect of certain compounds which also act as stabilizing compounds. It has been found that those stabilizing compounds previously enumerated in which lead is present are particularly effective as catalysts for promoting ester exchange. Ester exchange produces a generally superior pressure sensitive adhesive in accordance with the present invention as it improves the compatibility of the polyester-polyvinyl system and increases both the adhesion and cohesion of the adhesive. It is therefore desirable to add to mixtures incorporating a noncatalytic stabilizing compound such as, for example, the barium-cadmium organic complex and the tin organic complex, a catalytic stabilizing compound, such as the lead compounds previously enumerated or lithium ricinoleate. The latter has been found to be a particularly active catalyst in the polyester-polyvinyl resin system of the present invention.

It is to be understood that ester exchange is not essential to produce a usable pressure sensitive adhesive in accordance with the present invention. For example, polyesters having a relatively large number of ester groups per unit molecular weight can be combined with a low molecular weight polyvinyl resin and a high molecular weight polyvinyl resin to produce a usable pressure sensitive adhesive without ester exchange. Exemplary of such polyesters are those prepared from adipic acid and propylene or butylene glycols and those prepared from azelaic acid and 10% to 15% phthalic acid, particularly iso- or terephthalic acid. So that a workable viscosity is obtained, the molecular weight of these polyesters is preferably maintained between 3000 and 4000. A suitable low molecular weight polyvinyl resin is a vinyl chloride copolymer containing vinyl chloride and from 10% to 30% esters such as vinyl acetate or dialkyl maleate and having an intrinsic viscosity from 0.25 to 0.5. The high molecular weight polyvinyl resin in this system may be vinyl chloride alone or a copolymer containing up to 10% esters and having an intrinsic viscosity from 1.3 to 1.6. These reactants are combined in the following concentrations: 60 to 70 parts polyester, 25 to 30 parts low molecular weight polyvinyl resin, 5 to 10 parts high molecular weight polyvinyl resin, and up to 5 parts noncatalytic stabilizing compound.

Where a continuous process is desired for the production of the pressure sensitive adhesive, it is preferred that equipment particularly designed for the purpose be used in order that the number of process steps be reduced to a minimum. It is to be understood that the pressure sensitive adhesive of the invention is not limited to such equipment and that the equipment described is illustrative only of means conveniently adapted to its production. In the accompanying figure, the process as applied to the production of an article of manufacture comprising a paper or cloth web coated on one side with the pressure sensitive adhesive of the present invention is schematically represented.

With reference to the figure, a mixture of polyester-polyvinyl resin stabilizing compound in the proper proportions is fed through a feeding means 10 into an extruder 11. While similar to the standard plastics extruder, this machine possesses certain characteristics different from the conventional machine. It simultaneously and conveniently provides three functions necessary to the process. It contains means by which the mixture is heated to the proper reaction temperature range from about 140° C. to about 220° C. It also provides a high shear type of agitation necessary to carry the reaction to completion. Further, by controlling the rate of throughput of the mixture, it insures that the mixture is subjected to the required conditions of temperature and agitation for the requisite time.

In an extruder particularly well adapted for use with this process, a constant pitch, variable root type screw is used, the screw having a relatively large ratio of root diameter to bore diameter. It is operated from 2 to 3 times the revolutions per minute of the typical plastic extruder. The large ratio of root to bore diameters is required because the viscosity of the reacting mixture at the temperature of 140° C. to 220° C. is far below that of any ordinary plastic mixture. The high speed of rotation is required so that adequate agitation of the mixture occurs. All surfaces of the screw contacting the adhesive are finished to a high polish so that all material is discharged without hold-up in the extruder.

The reacted material passes from the extruder through a short manifold 12 to the end of a sheet extrusion die 13. The cross-sectional area of the manifold and the die are kept to a minimum so that a high velocity of product flow is maintained through them. All recesses of the manifold and the die are given a high polish to prevent any hold-up of material.

The reaction product is extruded through an opening 14 in the die. The opening is essentially a slit approximately 0.01 inch thick. The temperature of the material as it leaves the opening in the die is approximately 180° C. It passes from the die to a chrome-plated steel roll 15 which is maintained at a temperature of 200° C. The speed of this steel roll is regulated so as to maintain the film thickness of the reaction product between 0.002 to 0.004 inch. The additional heat from the steel roll transmitted to the film further reduces the viscosity of the film so that it may be wiped onto another surface.

A silicone rubber roll 16 rotates in a direction opposite to the rotation of the steel roll. A paper or cloth web 17 is drawn by the silicone roll so that the film of adhesive on the steel roll is wiped off on the web. The web with the adhesive film is then removed by an appropriate means (not shown) where it is cooled and wound in rolls.

The pressure sensitive adhesive of the present invention offers several unique advantages. When applied to a paper or cloth web and rolled so that the adhesive is between layers of the web no cold flow of the adhesive occurs. In addition, when the adhesive is exposed to ultraviolet rays, such as those found in sunlight, it effectively resists the deteriorating effects of these rays and remains tacky. Furthermore, its tensile strength and adhesiveness make it suitable for general application as a pressure sensitive adhesive.

I claim:
1. A process for the preparation of a pressure sensitive adhesive tape, which process comprises combining a saturated polyester of an organic acid selected from the group consisting of saturated monocarboxylic and dicarboxylic acids and a polyhydric alcohol with a polyvinyl resin in the presence of a stabilizing compound that is an acceptor for hydrogen chloride evolved from the polyvinyl resin to form a mixture containing by weight from about 60% to 90% polyesters having a molecular weight greater than about 1000 and from about 10% to 40% polyvinyl resin consisting of at least 50% vinyl chloride, the balancing comprising components selected from the group consisting of esters and vinyl alcohol, heating the mixture to a temperature from about 140° C. to about 220° C. and intensely agitating the mixture in means adapted to continuously extrude the reaction product through suitable opening means, transferring the reaction product to a first rotating means maintained at a tempearture of about 200° C., the rotation of the rotating means being regulated to maintain the film thickness of the reaction product between 0.002 inch to 0.004 inch, and wiping the reaction product on a backing material carried on a second rotating means rotating counter to the first rotating means.

2. Process in acordance with claim 1 wherein the polyester is formed by reacting a polyhydric alcohol selected from the group consisting of trimethylol propane; trimethylol ethane; glycerol; pentaerythritol; 1,2,6-hexanetriol, with a saturated monocarboxylic organic acid selected from the group consisting of 2-ethylhexoic, 2-ethylbutyric, and caprilic acids, until esterification is substantially complete, thereupon adding to the mixture a dihydric alcohol selected from the group consisting of propylene glycol; 1,3-butylene glycol; 2,3-butylene glycol; neopentyl glycol; 1,5-hexylene glycol; 1,5-pentanediol; 3-methyl pentanediol-1,5; and 2-ethylhexanediol-1,3, and a saturated dicarboxylic organic acid selected from the group consisting of adipic, azelaic, sebacic, and isosebacic.

3. Process in accordance with claim 1 wherein the polyester is formed by reacting a dihydric alcohol selected from the group consisting of 1,3-butylene glycol; 2,3-butylene glycol; neopentyl glycol; 1,5-hexylene glycol; 1,5-pentanediol; 3-methyl pentanediol- 1,5; 2-ethylhexanediol-1,3, with a saturated dicarboxylic organic acid selected from the group consisting of adipic, azelaic, sebacic, and isosebacic acids.

4. A process for the preparation of a pressure sensitive adhesive, which process comprises combining a saturated poleyster of an organic acid selected from the group consisting of saturated monocarboxylic and dicarboxylic acids and a polyhydric alcohol with a polyvinyl resin in the presence of a stabilizing compound that is an acceptor for hydrogen chloride evolved from the polyvinyl resin to form a mixture containing by weight from about 60% to 90% polyesters having a molecular weight greater than about 1000 and from about 10% to 40% polyvinyl resin consisting of at least 50% vinyl chloride, the balance comprising components selected from the group consisting of esters and vinyl alcohol, and simultaneously heating the mixture to a temperature from about 140° C. to about 220° C. and intensely agitating the mixture in means adapted to continuously extrude the reaction product through suitable opening means.

5. A process in accordance with claim 4, in which the reaction product is extruded through said opening means at a flow velocity wherein the mixture passes through said extruding means in from 6 minutes to 30 minutes.

No references cited.

ALFRED L. LEAVITT, *Primary Examiner.*

C. R. WILSON, *Assistant Examiner.*